(12) United States Patent
Yau (10) Patent No.: US 9,077,055 B2
(45) Date of Patent: Jul. 7, 2015

(54) RECHARGEABLE BATTERY SYSTEM (71) Applicant: Chi W. Yau, Escondido, CA (US)

(72) Inventor: Chi W. Yau, Escondido, CA (US)

(73) Assignee: Tricopian, LLC, Del Mar, CA (US)

( * ) Notice: Subject to any disclaimer, the term of this patent is extended or adjusted under 35 U.S.C. 154(b) by 131 days.

(21) Appl. No.: 13/678,351

(22) Filed: Nov. 15, 2012

(65) Prior Publication Data

US 2013/0149566 A1 Jun. 13, 2013

Related U.S. Application Data (60) Provisional application No. 61/560,746, filed on Nov. 16, 2011.

(51) Int. Cl.
H01M 10/48 (2006.01)
H01M 2/10 (2006.01)
H01M 10/42 (2006.01)
H01M 2/04 (2006.01)
H01M 2/02 (2006.01)
H01M 2/34 (2006.01)

(52) U.S. Cl.
CPC .......... *H01M 10/488* (2013.01); *H01M 2/1022* (2013.01); *H01M 2/046* (2013.01); *H01M 10/4257* (2013.01); *H01M 2/026* (2013.01); *H01M 2/344* (2013.01)

(58) Field of Classification Search
CPC .. Y02E 60/12; H01M 2/1241; H01M 2/1229; H01M 2/12; H01M 2/342; H01M 2/344; H01M 2/1205; H01M 10/52
USPC ............................. 429/53, 57, 72, 82, 83, 163
See application file for complete search history.

(56) References Cited

U.S. PATENT DOCUMENTS

| 2,119,063 | A |   | 5/1938  | Wagner |
|-----------|---|---|---------|--------|
| 4,700,375 | A |   | 10/1987 | Reed |
| 5,298,346 | A |   | 3/1994  | Gyenes et al. |
| 5,525,439 | A | * | 6/1996  | Huhndorff et al. ............. 429/91 |
| 5,544,784 | A |   | 8/1996  | Malaspina |
| 5,621,297 | A |   | 4/1997  | Feldstein |
| 5,694,019 | A |   | 12/1997 | Uchida et al. |

(Continued)

FOREIGN PATENT DOCUMENTS

EP 0 577 121 A1 1/1994
WO WO 01/95454 A1 12/2001

OTHER PUBLICATIONS

International Search Report and Written Opinion, filed in PCT/US2012/065326 on Feb. 6, 2013.

(Continued)

*Primary Examiner* — Patrick Ryan
*Assistant Examiner* — Ben Lewis
(74) *Attorney, Agent, or Firm* — Knobbe Martens Olson & Bear LLP (57) ABSTRACT A rechargeable battery system can include features to facilitate determination of the charge state of a battery or a battery power unit. A rechargeable battery system can include a battery case that can hold a plurality of batteries. The batteries held by the battery case can include a tab located on a portion of the battery, such as, the terminal. The tab can include indicia of the charge state of the battery, and can be detached when the battery is at least partially discharged. The tab can facilitate determination of the charge state of the battery by allowing identification of batteries with the tab attached and batteries from which the tab has been detached.

11 Claims, 6 Drawing Sheets

(56) References Cited

U.S. PATENT DOCUMENTS

| | | |
|---|---|---|
| 6,154,006 A | 11/2000 | Hatanaka et al. |
| 6,191,554 B1 | 2/2001 | Nakane |
| 6,370,844 B1 | 4/2002 | Stricker |
| 6,822,422 B2 | 11/2004 | Sagawa |
| 7,491,466 B2 | 2/2009 | Feddrix et al. |
| 8,055,919 B2 | 11/2011 | Magnusson |
| 2001/0037207 A1 | 11/2001 | Dejaeger |
| 2004/0113588 A1 | 6/2004 | Mikuriya et al. |
| 2006/0216586 A1* | 9/2006 | Tucholski .................... 429/162 |
| 2006/0275656 A1 | 12/2006 | Feddrix et al. |
| 2007/0273327 A1 | 11/2007 | Daniel et al. |
| 2009/0212781 A1 | 8/2009 | Bertness et al. |
| 2010/0052609 A1 | 3/2010 | Daniel et al. |
| 2010/0169231 A1 | 7/2010 | Bowles et al. |
| 2010/0205463 A1 | 8/2010 | Magnusson |
| 2010/0274904 A1 | 10/2010 | Schirar et al. |
| 2010/0312380 A1 | 12/2010 | Lowe et al. |
| 2010/0320967 A1 | 12/2010 | Sa |
| 2011/0225098 A1 | 9/2011 | Wolff et al. |
| 2013/0063073 A1 | 3/2013 | Kawasaki et al. |

OTHER PUBLICATIONS

International Search Report and Written Opinion, filed in PCT/US2013/065308 on May 7, 2014.

International Search Report and Written Opinion, filed in PCT/US2013/031667 on Jul. 19, 2013.

International Search Report and Written Opinion, filed in PCT/US2013/030578 on Jul. 9, 2013.

\* cited by examiner

RECHARGEABLE BATTERY SYSTEM

CROSS-REFERENCE TO RELATED APPLICATIONS

This application claims priority to U.S. Provisional Application 61/560,746, filed Nov. 16, 2011, the which is herein incorporated by reference in its entirety.

BACKGROUND OF THE INVENTION

1. Field of the Invention

This relates to the field of batteries, and particularly to the field of rechargeable batteries.

2. Description of the Related Art

Batteries power a variety of devices. As more devices become battery powered, consumer demand for batteries increases. This results in the manufacturing and disposal of ever greater numbers of batteries, which can include heavy metals and other toxic chemicals. Some people have begun using rechargeable batteries to save money and to minimize battery waste. However, rechargeable batteries require expensive chargers, and are not as convenient as disposable batteries.

Additionally, use of rechargeable batteries requires a user to be sufficiently organized to track the charge state of the batteries. This tracking is made difficult as the appearance of a battery is not changed by a battery's charge state. Although an integrated power meter can allow a user to see the charge state of a battery, such power meters are expensive and drain some amount of power from a battery.

SUMMARY OF THE INVENTION

Some embodiments relate to rechargeable battery system. The rechargeable battery system can include, for example, a first battery in a case having first and second opposing ends, a first battery terminal at the first end of the first battery, and a removable tab applied to the first terminal of the first battery, the tab can cover the terminal to prevent electrical contact with the terminal and can bear indicia indicating that the battery is in a charged state. In some embodiments, the first battery can be in a substantially fully charged state.

In some embodiments, the rechargeable battery system can further include a battery case containing a plurality of rechargeable batteries including the first battery. In some embodiments, the plurality of rechargeable batteries can further include a second battery in the case. The second battery can differ from the first battery in that the second battery has no removable tab and is not in a substantially fully charged state.

In some embodiments of the rechargeable battery system, the first battery can be a 1.5V battery, a AAA battery, or a AA battery. In some embodiments, the indicia on the rechargeable battery system removable tab can be, for example, a word, a color, or a pattern. In some embodiments, the rechargeable battery system can further include a second removable tab bearing indicia that the battery is in a partially charged state. In some embodiments, the substantially fully charged state comprises the charge state of the battery at the time of sale.

Some embodiments relate to a method for managing rechargeable batteries. In some embodiments, the method for managing rechargeable batteries can include, for example, providing a case containing a plurality of rechargeable batteries, each battery having a tab on a terminal of the battery, and each battery having a substantially full charge. In some embodiments, the method for managing rechargeable batteries can include, for example, removing a battery from the case, removing the tab from the battery, and using the battery such that the battery is no longer substantially fully charged. In some embodiments the method for managing rechargeable batteries can include, replacing the used battery in the case and differentiating between unused batteries and used batteries in the case by the presence or absence of a tab on the batteries.

In some embodiments of the method of managing rechargeable batteries, the tab can include indicia of the charge state of the battery, such as, for example, a word, a color, or a visual marking. Some embodiments of the method of managing rechargeable batteries can further include, for example, providing a second tab on a portion of each of said plurality of the rechargeable batteries, which tab can bear indicia of a partially discharged state of the battery.

In some embodiments the method of managing rechargeable batteries can further include, removing the used battery from the case, removing a second tab from the battery, and replacing the substantially discharged battery in the case. In some embodiments, the method of managing rechargeable batteries can further include differentiating between the partially discharged batteries and the substantially discharged batteries in the case by the presence or absence of the second tab on the batteries.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION OF THE PREFERRED EMBODIMENT

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein relate to rechargeable battery system. Particularly, some embodiments disclosed herein relate to exemplary components of a rechargeable battery system. Some embodiments disclosed herein relate to a method of using a rechargeable battery system. Particularly, some embodiments disclosed herein relate methods of using a tab to determine the charge status of a battery used in a rechargeable battery system.

A rechargeable battery system can use a variety of components and have a variety of features configured to assist in determining the charge status of a battery, and in using the battery in a power supplying application or in connection with a vending system. Some embodiments of a rechargeable battery system described herein can include, for example, a battery case, a battery, and a removable tab. Some embodiments of a method of using a rechargeable battery system described herein can include, for example, placement of batteries in a battery case, and placement of a tab on each of the batteries that is substantially fully charged, or that has been insubstantially discharged.

As used herein, the term battery may refer not only to a standard battery such as a AA, AAA, 9V, or other common battery, but to a battery power unit as described herein. For example, a battery power unit having a charge and discharge port may, for simplicity and convenience, be referred to as a battery. The term battery may also refer to other types of power supply units, such as fuel cells.

As used herein, the terms "fully charged" and "insubstantially discharged" refer to a charge state that is present when the battery is purchased for use. In some embodiments, this charge state can be greater than about 75%, greater than about 80%, greater than about 85%, greater than about 90%, or greater than about 95% of the full charge capacity.

As used herein, the term "partially discharged" refers to a charge state that is less than the charge state of the purchased battery. This charge state can be attained by use of the battery.

As used herein, the term "substantially discharged" refers to a charge state in which the battery user determines that the battery is no longer capable of performing its desired function. In some embodiments, this charge state can correspond to less than 30% charge, less than 25% charge, less than 20% charge, less than 15% charge, less than 10% charge, less than 5% charge, less than 1% charge, or less than any other desired charge amount.

Figure 1:
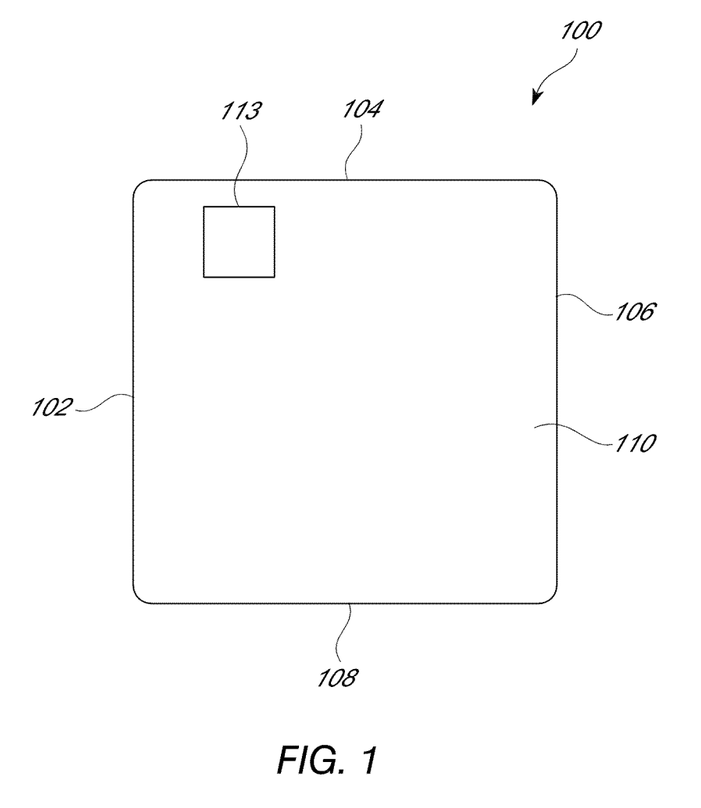
FIG. 1 depicts a front plan view of one embodiment of a battery case.

FIG. 1 depicts a front plan view of one embodiment of a battery case 100. In some embodiments, the battery case can be reusable or disposable. The battery case can comprise a variety of shapes and sizes. In some embodiments, a case 102 can comprise, for example, any desired type of container or packaging such as, for example, an envelope, a bag, a box, shrink wrap, a blister pack, or any other type of container or packaging. In some embodiments, the battery case 100 can comprise a rectangular prism, and can have a first side 102, a second side 104, a third side 106, a fourth side 108, a front side 110, and a back side 112. The first side 102, second side 104, third side 106, fourth side 108, front side, 110, and back side (not shown) define and enclose an interior volume of the battery case. In some embodiments, the interior volume of the battery case 100 can be configured to hold, for example, one more batteries.

In some embodiments, the battery case 100 can include an identification feature 113. In some embodiments, identification feature can include, for example, a unique identification feature or a non-unique identification feature. The identification feature 113 can be affixed, adhered, or attached to the battery case 100, and in some embodiments, the identification feature 113 can be integrated into the battery case 100. The identification feature 113 can include, for example, a computer readable code, an electronic tag, (e.g., an RFID tag, a magnetic tag, etc.) a color or text pattern, an identifying signal, or any other identifying feature.

Figure 2A:
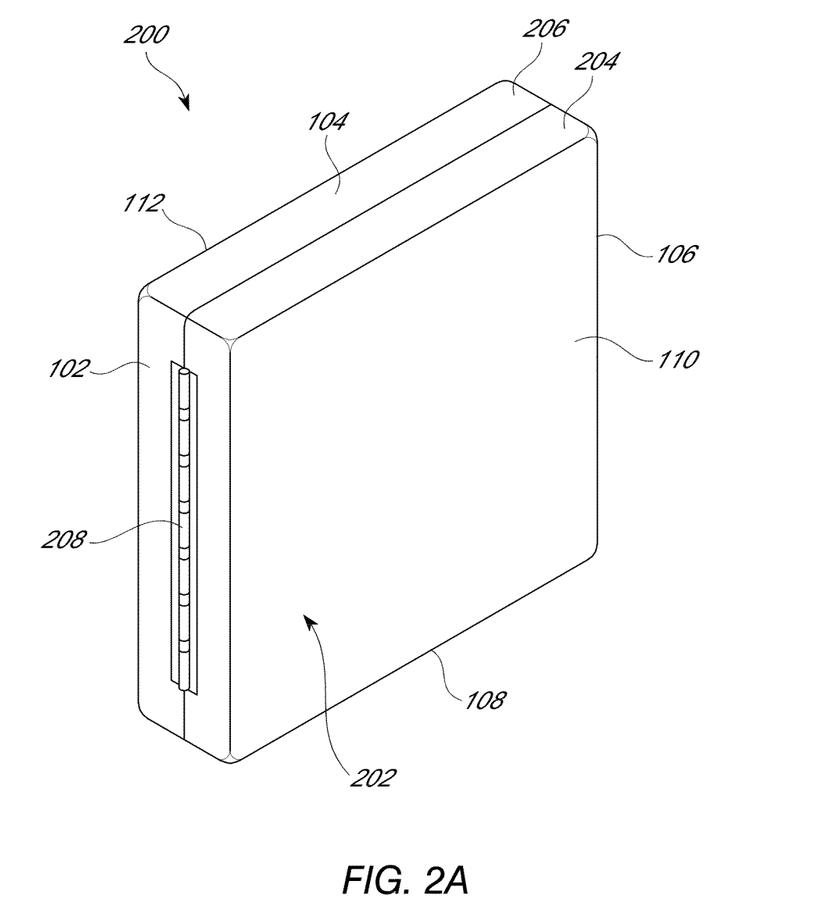
FIG. 2A depicts a perspective view of one embodiment of a battery case.
Figure 2B:
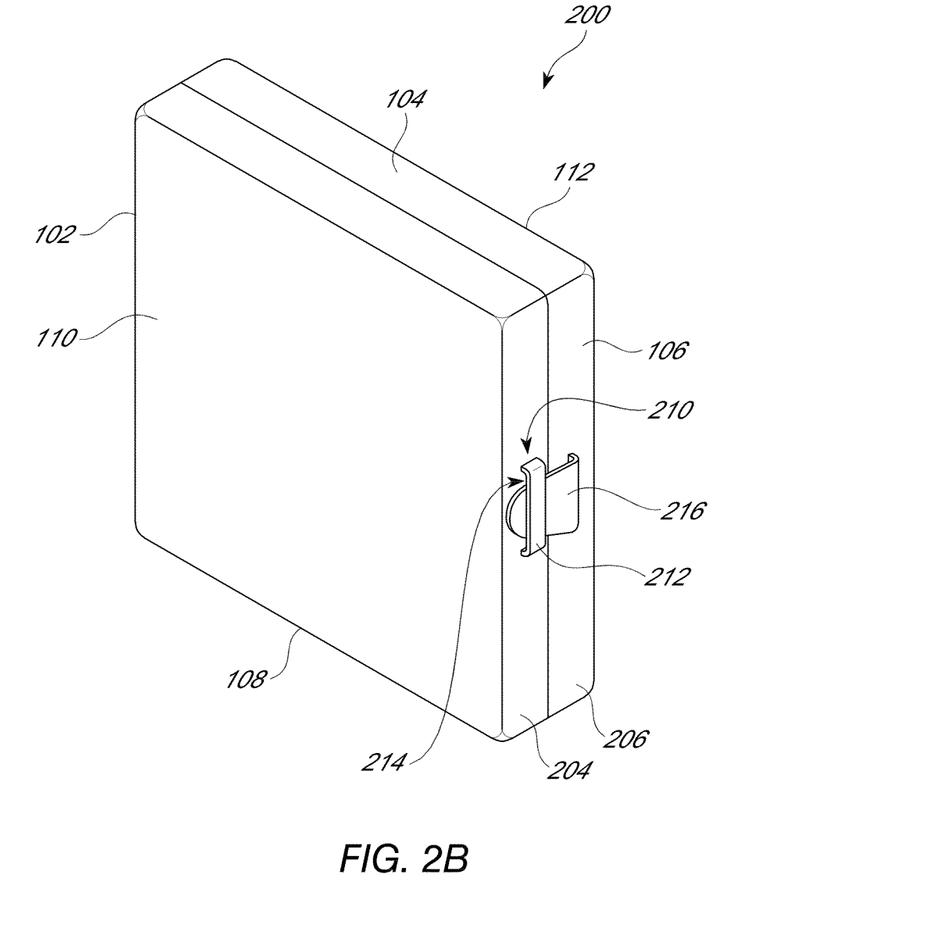
FIG. 2B depicts a perspective view of one embodiment of a battery case.

The battery case 100 can be configured to be opened and closed to allow access to the interior volume of the battery case 100. In some embodiments, the battery case can comprise, for example, pieces dynamically connected together to allow manipulation of the battery case 100 between a first, closed position, and a second, open position. As depicted in FIG. 2, a battery case 200 having a first side 102, a second side 104, a third side 106, a fourth side 108, a front side 110, and a back side 112, the sides defining an interior volume 202, can comprise a first piece 204 moveably connected to a second piece 206. In some embodiments, and as depicted in FIG. 2, the first and second pieces 204, 206 can be connected, for example, by a hinge 208. In some embodiments, the hinge 208 can allow relative rotational movement of the first piece 204 and the second piece 206 to allow transitioning of the battery case 100 between a first, closed position and a second, open position.

In some embodiments, and as depicted in FIG. 2a, the battery case 200 can additionally include, for example, a locking feature 210. The locking feature 210 can comprise any feature configured to secure the battery case 200 in a first, closed position. In some embodiments, the locking feature 210 can include, for example, a latch. The latch can include, for example, a first feature configured to mate with a second feature to secure the battery case 200 in the first, closed position. In one specific example, and as depicted in FIG. 2a, the locking feature 210 can comprise a receiver 212 configured to define a volume 214 into which a penetrator 216 can be securingly inserted.

Figure 3:
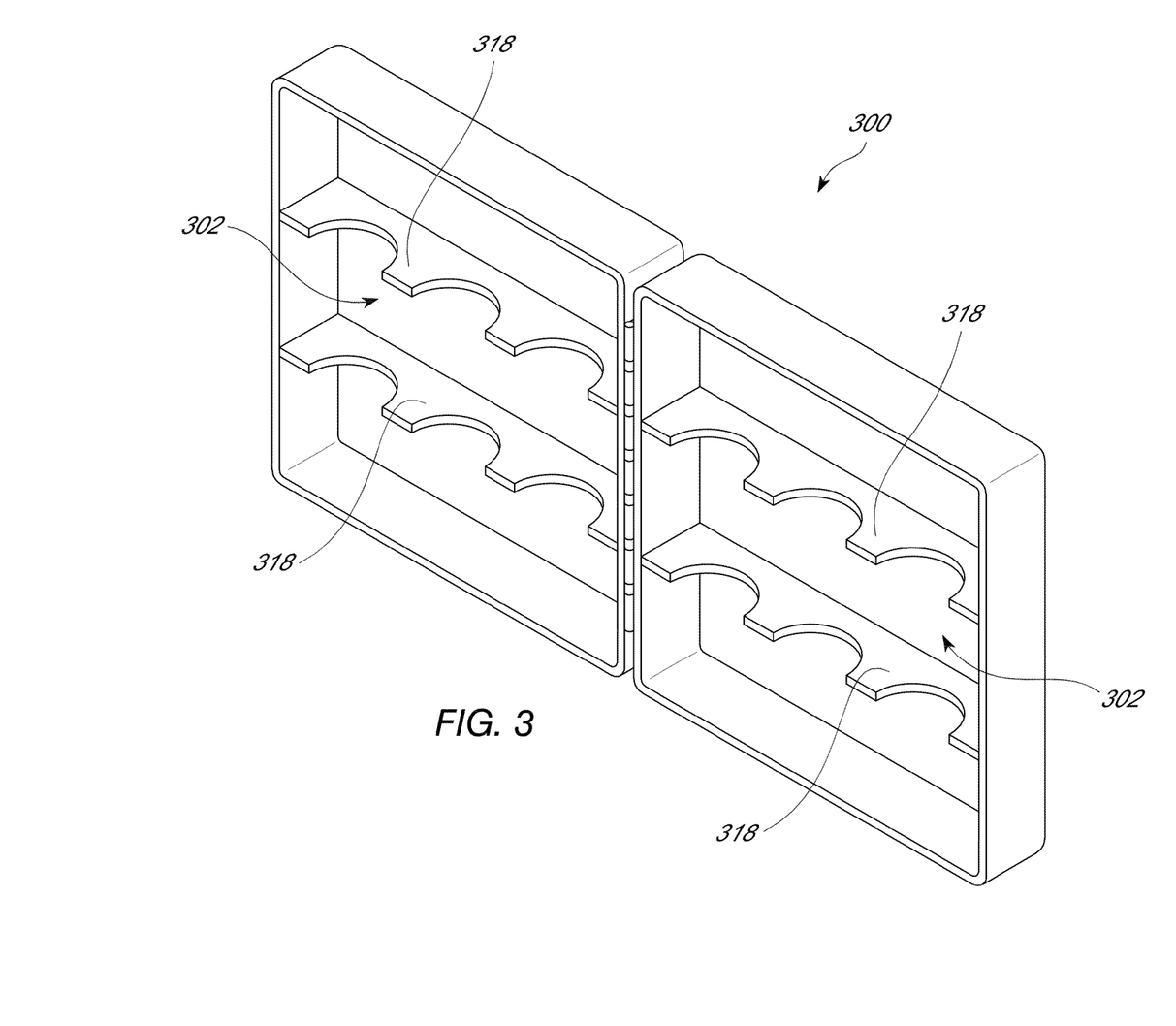
FIG. 3 depicts a plan view of one embodiment of a battery case in an open position.

FIG. 3 depicts a plan view of one embodiment of the battery case 300 in a second, open configuration. In some embodiments, the battery case 300 can include securement features 318 which securingly receiving one or several batteries in the interior volume 302 of the battery case 300. In some embodiments, these securement features 318 can be sized and shaped to abut portions of a battery to secure the battery in the battery case 300 when the battery case is in its first, closed position.

Figure 4:
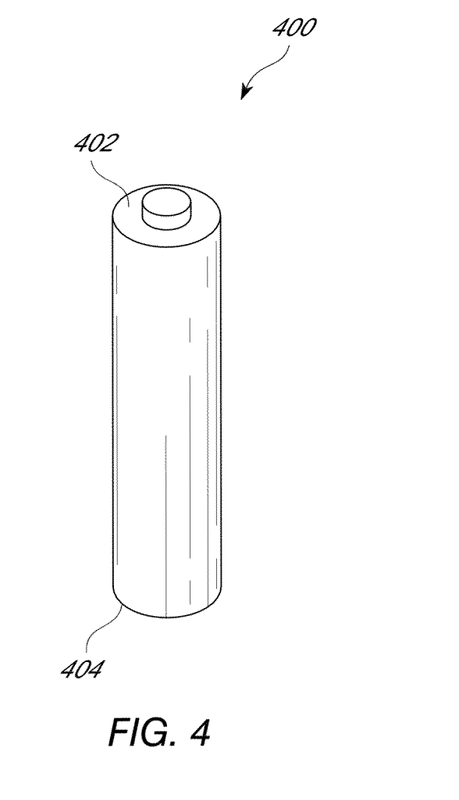
FIG. 4 depicts one embodiment of a battery.

As discussed, the battery case can be configured to receive one or several batteries within the interior volume of the battery case. FIG. 4 depicts one embodiment of a battery 400 capable of use with the battery case. The battery 400 can comprise any of a variety of sizes, types, and shapes of batteries. In some embodiments, the battery 400 can be, for example, a AAA-size battery, a AA-size battery, a C-size battery, a D-size battery, a 9-volt battery, or any other desired type of battery. The battery 400 can be a 1 volt, 1.2 volt, 1.5 volt, 3 volt, 4.5 volt, 6 volt, 9 volt, 12 volt, be in a range from 1.5 to 3.7 volt, be in a range of 1 to 5 volt, or any other battery. In some embodiments, the battery 400 can have a first end 402 and second end 404, which can, in some embodiments, be opposingly positioned. In some embodiments, the first and second opposing ends 402, 404 of the battery 400 can comprise first and second electric terminals. In some embodiments of the battery 400, such as when the battery 400 comprises a 9-volt battery, the first and second opposing ends 402, 404 do not comprise first and second electric terminals, rather, the first and second electric terminals can be located at one of the first or second opposing ends 402, 404. Similarly, in other battery configurations, the electric terminals can be located at a variety of positions on a battery.

In some embodiments, the battery case may be configured to receive one or more battery power units. A battery power unit is a rechargeable unit having one or more electrochemical cells contained within an enclosure and having a charge port and a discharge port. The battery power unit may have one of a variety of form factors. For example, the battery power unit may be cylindrical, circular, square, rectangular prism, or any other desirable form factor.

The battery power unit may comprise a plurality of battery cells, or may have a single battery cell. Where the battery power unit comprises a plurality of battery cells, the battery cells may be one of many battery chemistries suitable for rechargeable batteries. For example, the battery cells may be Li-ion, NiMH, NiCd, fuel-cell based, super capacitor, ultracapacitor, or lead acid. The battery cells may be wired in series or parallel, connected to a single discharge port.

As used herein, the term terminal or battery terminal may refer also to the discharge port or the charge port of the battery power unit. The discharge port may be one of many varieties, such as those commonly used on electrical devices having an internal or integral battery or power source. Specifically, the discharge port maybe configured to have a port compliant with the universal serial bus (USB) standard. In some embodiments, the discharge port may be a 3.5 mm jack, a standard 120V plug, microUSB, or other suitable discharge port. The charge port may be one of many varieties, including those described herein with reference to the discharge port. The charge port is wired to the battery cell or cells within the battery power unit such that a power source supplied to the charge port will charge all the battery cells within the battery power unit. In some embodiments, the charge and discharge ports may be co-located on a single end of the battery power unit for convenience of access and use. In some embodiments, the functions of the charge and discharge ports can be combined into a single port. In some embodiments, the charge and discharge ports can be separate.

The battery power unit may also comprise internal electronics configured to transform, step-up, step-down, modulate, rectify, regulate, or otherwise adapt the output of the battery cell or cells to be compatible with a specific device to be charged. The internal circuitry may be connected to one or both of the charge and discharge ports. The internal circuitry may be connected to the discharge port and provide communication functionality such that, upon connecting a cord or plug to the discharge port, the internal circuitry identifies the device or type of device, and adjusts the output power or signal accordingly. The internal electrical circuitry is also configured to adapt a power source or signal applied to the charge port such that the applied power source or signal is transformed or changed to be compatible with and capable of charging or recharging the battery cell or cells within the battery power unit enclosure. Either the charging port or discharging port can be used by an external charging system to ascertain the type or model or category of the battery power unit for the purpose of product identification and/or application of appropriate charging regime, program, or algorithm.

In one exemplary embodiment, the battery power unit may enclose one or a plurality of Li-ion 18650-type batteries. The batteries are connected to a discharge port which comprises a USB port. The battery power unit has internal circuitry which transforms the voltage to a voltage used in a handheld mobile device, such as a cellular telephone or a tablet computer. In this embodiment, the battery power unit acts as a backup power supply for the handheld mobile device, providing a source from which to charge the internal battery of the mobile handheld device.

Battery case 300 may have securement features 318 sized and configured to receive one or more battery power units.

Figure 5:
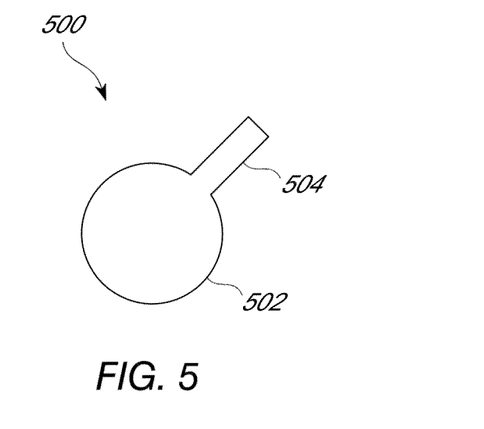
FIG. 5 depicts one embodiment of a tab.

In some embodiments, the charge state of the battery can be indicated through the application of one or more tabs to the battery. FIG. 5 depicts one embodiment of a tab 500 comprising an attachment portion 502 and a pull portion 504. In some embodiments, the attachment portion 502 can be configured for attachment to the battery. In some embodiments, the attachment portion 502 can attach to the battery via, for example, adhesion, snaps, or the like. In some embodiments, the attachment portion 502 of the tab can comprise an adhesive configured to adhere to the battery. In some embodiments, the attachment portion 502 of the tab 500 can be round. In some embodiments, the attachment portion 502 of the tab 500 can be sized to cover, for example, one or more of the terminals of the battery. In other embodiments, the attachment portion is attached to the battery, for example, to a terminal. FIG. 5 depicts one embodiment of a tab having a round attachment portion 502 sized to cover one of the terminals of the battery.

In some embodiments, the tab 500 may be configured for attachment to the battery power unit or may be so attached. In some embodiments, the tab 500 may be sized to cover the discharge port of the battery power unit. In some embodiments, the tab 500 may cover an entire end of the battery power unit.

Like the attachment portion 502 of the tab 500, the pull portion 504 of the tab 500 can comprise a variety of sizes and shapes. In some embodiments, the pull portion 504 of the tab 500 can be rectangular and can radially extend from the center of the attachment portion 502 of the tab 500. A person of skill in the art will recognize that a tab 500 is not limited to the specific above disclose embodiments of a tab, but that a tab can include a variety of shapes, sizes, features, and combinations.

The tab 500 can comprise any material, and can have any marking, pattern, logo, color, or color scheme. The tab 500 can, for example, comprise a conductive material or a non-conductive material. In some embodiments in which the tab 500 is configured for placement over one of the terminals of the battery, the tab 500 can advantageously comprise a non-conductive material which can prevent undesired battery discharge. In some embodiments, the tab 500 can comprise indicia indicative of the charge state of the battery or the battery power unit. The indicia indicative of the charge state of the battery can include, for example, a word, a name, a logo, a color or color scheme, or any other desired indicia. Such indicia may, for example, indicate that the battery is charged, or may instruct a user to remove before use. In one embodiment, the tab 500 includes a marking indicating that the battery or battery power unit is fully charged, or substantially fully charged. The battery or battery power unit is substantially fully charged when the battery or battery power unit is insubstantially discharged. In some embodiments, the battery or battery power unit is substantially fully charged when it is prepared for sale as a charged battery or battery power unit and/or sold as a charged battery or battery power unit.

Figure 6:
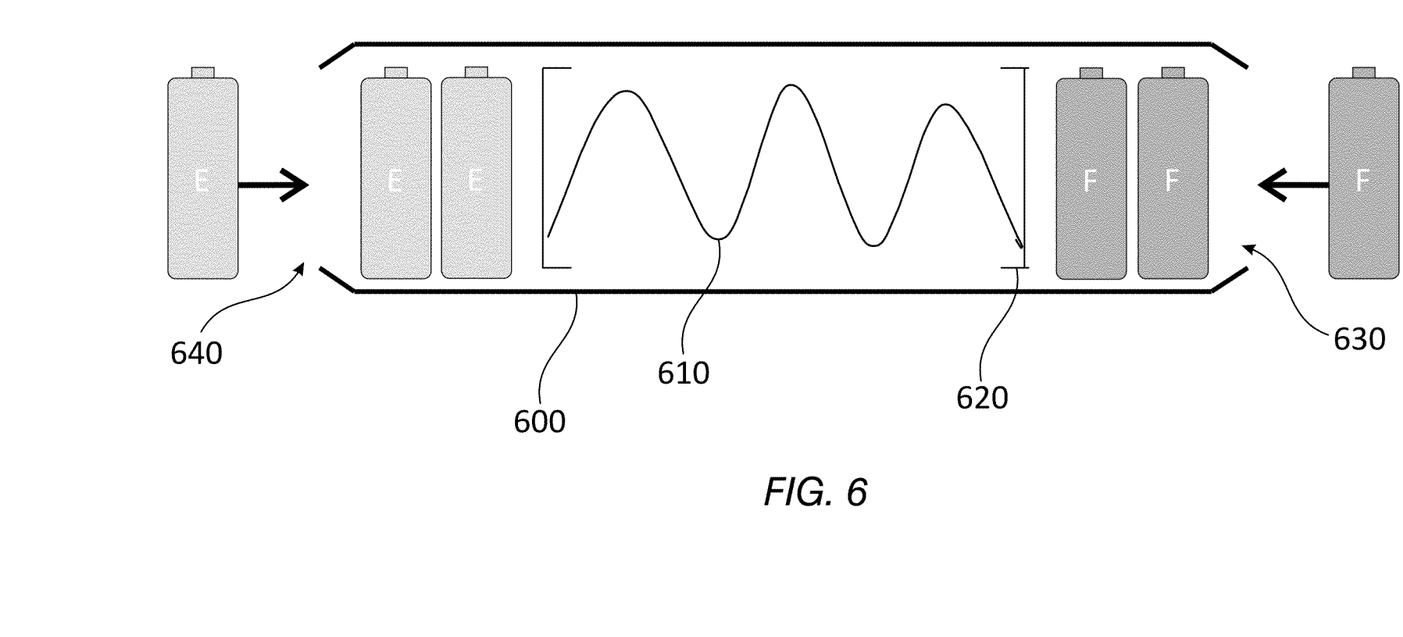
FIG. 6 depicts an embodiment of a battery storage package.

FIG. 6 depicts an embodiment of a battery storage package which has dual openings. Battery storage package has a structural member 600, a first end 630 and a second end 640. Structural member 600 may be made of a non-conductive material, to guard against unintentional or unwanted battery discharge. The non-conductive material may be, for example, plastic, nylon, wood, and other non-conductive materials. Structural member 600 is sized to receive and contain rechargeable battery. First end 630 may be designated for receiving or dispensing fresh, charged, fully charged, or new batteries. Second end 640 may be designated for receiving empty, spent, discharged, or insubstantially charged batteries. The designations may be words, symbols, numbers, codes, or other designations indicating the state of a battery's charge.

Structural member 600 houses a spring 610 and at least receiving element 620. In some embodiments, there is a receiving element 620 corresponding to each of the first end 630 and the second end 640. Receiving element 620 is attached to spring 610, and is moveable within structural member 600. Spring 610 compresses and expands within structural member 600. As spring 610 compresses and expands, receiving elements 620 move within structural member 600. Spring 610 and receiving elements 620 are sized such that they do not extend out of structural member 600.

First end 630 is sized to accept a battery. As a fresh battery is inserted into first end 630, the battery impinges on receiving element 620 and displaces receiving element 620. The displacement of receiving element 620 compresses spring 610. Once the battery has been inserted, spring 610 exerts an expansive on force receiving element 620, which exerts a force on the battery, which, in turn, exerts a force on the structural member. Structural member 600 is sized and shaped such that, as the battery exerts the force on the structural member, the structural member 600 also exerts a force on the battery, and the battery is removably held within structural member 600. The structural member is also formed with a notch, indentation, window, or other similar feature which allows a user to retract a battery by applying a force which will overcome the force which removably holds the battery in place.

The structure and features of the second end 640 are similar to those described herein regarding first end 630. In addition to providing a surface for attachment of spring 610, receiving elements 620 also provide a separation or segregation between the first end 630 and the second end 640. In this way, a user may keep full and empty batteries segregated from each other.

In operation, a user may obtain fresh, new, or fully charged batteries. The user may place the fresh batteries into first end 630 until the spring is at its maximum compression, or until the structural member 600 cannot contain any more batteries, or the user may acquire the battery storage package pre-filled with fresh batteries. Receiving element 620 ensures that the fresh or full batteries can only be retracted or removed from structural member 600 via the first end 630. As fresh batteries are needed, a user removes batteries from the fresh end. Spent batteries, which have been replaced by fresh batteries from the battery storage package, are then inserted into second end 640. As a fresh or full battery is removed from first end 630, space is made available for another battery to be stored within structural member 600. Specifically, space is made available for empty or spent batteries to be inserted into second end 640. In this manner, the number of batteries stored within the battery storage package may be constant, and the fresh or full batteries are maintained separate or segregated from the empty or spent batteries.

In some embodiments, battery storage package may comprise conjoined packages or containers, such as nylon mesh bags. In this embodiment, nylon mesh bags may be attached to each other, having a separating layer. Each bag has an opening indicated for either fresh or empty batteries. The conjoined nylon mesh bags have a separating layer within which maintains the batteries of different charge states separate from each other. In some embodiments, the battery storage package may be a container having two re-sealable openings and an internal divider between two separate internal volumes.

In some embodiments the charge state of the battery or battery power unit is indicated by a single tab. This tab can, for example, indicate that the battery or battery power unit is substantially fully charged. In some embodiments, the charge state of the battery or battery power unit can be indicated by a plurality of tabs. Specifically, each of the plurality of tabs can be indicative of a different charge state ranging from substantially fully charged to substantially fully discharged. In one embodiment, for example, the presence of the first tab can indicate that the battery or battery power unit is substantially fully charged, the presence of the second tab can indicate that the battery or battery power unit is at least partially discharged, or is used, and the absence of both the first or second tab can indicate that the battery or battery power unit is substantially fully discharged.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A rechargeable battery system, comprising:
   a first battery having first and second opposing ends;
   a first battery terminal at said first end of said first battery;
   a removable tab applied to said first terminal of said first battery, said removable tab covering the terminal to prevent electrical contact therewith, and bearing indicia thereon indicating that said first battery is in a charged state; and
   a battery case containing a plurality of rechargeable batteries including said first battery and a second battery in said case, wherein said first battery is in a substantially fully charged state, and wherein said second battery has no removable tab and is not in a substantially fully charged state.

2. The rechargeable battery system of claim 1, wherein said first battery comprises a 1.2 to 1.5V battery.

3. The rechargeable battery system of claim 1, wherein said first battery is selected from the group comprising an AAA battery, an AA battery, a C battery, a D battery, or a 9V battery.

4. The rechargeable battery system of claim 1, wherein said first battery comprises a battery power unit.

5. The rechargeable battery system of claim 1, wherein said indicia on said removable tab is selected from the group consisting of a word, a color, a pattern, an alphanumeric string, or a date.

6. The rechargeable battery system of claim 1, further comprising a second removable tab bearing indicia that said first battery is in a partially charged state.

7. The rechargeable battery system of claim 1, wherein said substantially fully charged state comprises the charge state of the battery at a time of sale.

8. A rechargeable battery system, comprising:
   a first battery power unit having first and second opposing ends;
   a discharge port at said first end of said first battery power unit; and
   a removable tab configured for application to said discharge port of said first battery power unit, said removable tab configured to cover the discharge port to prevent electrical contact therewith, and bearing indicia thereon indicating that said first battery power unit is in a charged state;
   wherein said first battery power unit is in a substantially fully charged state.

9. The rechargeable battery system of claim 8, further comprising a battery case containing a plurality of rechargeable battery power units including said first battery power unit.

10. The rechargeable battery system of claim 8, wherein the battery power unit comprises an enclosure housing a plurality of battery cells each connected to the discharge port.

11. The rechargeable battery system of claim 10, wherein the discharge port is a universal serial bus port.

* * * * *